United States Patent
Jung et al.

(10) Patent No.: US 9,106,662 B2
(45) Date of Patent: Aug. 11, 2015

(54) METHOD AND APPARATUS FOR CONTROLLING LOAD ALLOCATION IN CLUSTER SYSTEM

(71) Applicant: Electronics and Telecommunications Research Institute, Daejeon (KR)

(72) Inventors: Joon Young Jung, Daejeon (KR); Dong-oh Kang, Daejeon (KR); Chang Seok Bae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 244 days.

(21) Appl. No.: 13/769,775

(22) Filed: Feb. 18, 2013

(65) Prior Publication Data

US 2014/0192653 A1    Jul. 10, 2014

(30) Foreign Application Priority Data

Jan. 7, 2013    (KR) ........................ 10-2013-0001550

(51) Int. Cl.
*H04L 1/00*    (2006.01)
*H04L 29/08*    (2006.01)

(52) U.S. Cl.
CPC .................................. *H04L 67/1002* (2013.01)

(58) Field of Classification Search
USPC ......... 370/236, 234, 235, 338, 401, 352, 389, 370/432, 386, 428; 709/203, 224, 234, 238; 713/340
See application file for complete search history.

(56) References Cited

U.S. PATENT DOCUMENTS

| | | | |
|---|---|---|---|
| 2005/0149768 A1 | 7/2005 | Kwa et al. | |
| 2009/0158074 A1* | 6/2009 | Oh et al. | ........................ 713/340 |
| 2010/0138677 A1 | 6/2010 | Pagan et al. | |

FOREIGN PATENT DOCUMENTS

| | | |
|---|---|---|
| JP | 2011-76469 A | 4/2011 |
| KR | 10-2006-0111658 A | 10/2006 |
| KR | 10-2009-0062107 A | 6/2009 |
| KR | 10-2010-0062954 A | 6/2010 |
| KR | 10-2011-0029833 A | 3/2011 |

* cited by examiner

*Primary Examiner* — Chi H Pham
*Assistant Examiner* — Alexander O Boakye
(74) *Attorney, Agent, or Firm* — William Park & Associates Ltd.

(57) ABSTRACT

An apparatus for controlling load allocation in a cluster system includes a cluster module having a plurality of target nodes and a cluster power management module. The cluster power management module analyzes resource usage of the target nodes by monitoring the load states of the target nodes. The cluster power management module adaptively allocates loads to the target nodes based on the analyzed resource usage and N allocation thresholds settled in response to an increase of the analyzed resource usage. The cluster power management module controls the target nodes so that the power state can be changed with the adaptively allocated loads.

15 Claims, 3 Drawing Sheets

METHOD AND APPARATUS FOR CONTROLLING LOAD ALLOCATION IN CLUSTER SYSTEM

CROSS-REFERENCE(S) TO RELATED APPLICATION(S)

The present invention claims priority of Korean Patent Application No. 10-2013-0001550, filed on Jan. 7, 2013, which is incorporated herein by reference.

FIELD OF THE INVENTION

The present invention relates to a cluster system; and more particularly, to an apparatus and a method for adaptively controlling load allocation of target nodes in a cluster system.

BACKGROUND OF THE INVENTION

As well-known, along with the trend toward the increase in the number and the size of a data center including a plurality of devices such as servers, storages and the like, a power consumed by the data center increases abruptly. In order to solve the problem of large power consumption, technical approach has made such as development of a server having high power conversion efficiency and low power consumption For example, servers in an idle state consume about 60% of the electricity energy. In a data center, servers run at efficiency of about 5% to 20% to cut server response time. To do so, about 10% of the servers in average place in a standby mode.

A method for managing loads such as servers in a cluster system evenly allocates the loads to the servers considering performance. Although this leads to improve the performance, the power consumption increases. Thus, the load allocation method is not suitable for reducing power consumption.

There is a technique to switch on/off a server on a single threshold basis by the amount of a load. However, this technique is disadvantageous in that a long period of switching on time of the server deteriorates performance of the cluster system and in that frequent on/off operations of the server results in large power consumption. Hence, such conventional technique cannot be used as a desirable load allocation method in view of performance and power consumption.

SUMMARY OF THE INVENTION

In accordance with a first aspect of the present invention, there is provided an apparatus for controlling load allocation in a cluster system, the apparatus including: a cluster module having a plurality of target nodes; and a cluster power management module configured to analyze resource usage of the target nodes by monitoring load states of the target nodes, allocate loads to the target nodes based on the analyzed resource usage and N allocation thresholds that have settled in response to an increase of the analyzed resource usage, and control the target nodes so that the power states of the target nodes can be changed in accordance with the allocated loads.

Preferably, the cluster power management module includes: a node monitoring unit configured to monitor the load states of the target nodes; a node usage analysis unit configured to analyze the resource usage of the target nodes using the monitored data; a threshold management unit configured to check, when the analyzed resource usage increases, an allocation threshold to which the analyzed resource usage belongs among the N allocation thresholds and determine additional operation preparation of one or more target nodes adequate for the checked allocation threshold; a load control unit configured to adaptively control load allocation of the target nodes in accordance with the determined operation preparation; a load allocation unit configured to adaptively allocate loads to the target nodes based on the adaptive control of the load allocation; and a node power control unit configured to control the power states of the one or more target nodes in accordance with the adaptively allocated loads.

Preferably, the analyzed resource usage includes resource usage at a cluster level and resource usage at a target node level.

Preferably, the threshold management unit determines, when the analyzed resource usage does not exceed an N-th allocation threshold among the N allocation thresholds, additional operation preparation of one or more target nodes adequate for a (N−1)-th allocation threshold.

Preferably, the threshold management unit determines, when the analyzed resource usage exceeds an N-th allocation threshold among the N number allocation thresholds, additional operation preparation of one or more target nodes adequate for the N-th allocation threshold.

Preferably, the power states of the one or more target nodes are changed into any one of an on state, a sleep state, a hibernation state and an OFF state.

In accordance with a second aspect of the present invention, there is provided a method for controlling load allocation in a cluster system, the method including: monitoring load states of target nodes in the cluster system; allocating loads of the target nodes based on resource usage of the target nodes which have been analyzed using the monitored load states and N allocation thresholds that have settled in response to an increase of the resource usage; and controlling the target nodes to change the power state thereof in accordance with the allocated loads.

Preferably, controlling the target nodes to change the power state thereof includes: analyzing the resource usage of the target nodes; checking, when the analyzed resource usage increases, an allocation threshold to which the analyzed resource usage belongs to among the N allocation thresholds; determining additional operation preparation of one or more target nodes adequate for the checked allocation threshold; adaptively allocating the loads of the target nodes based the determined operation preparation; and controlling the power states of the target nodes in accordance with the adaptively allocated loads.

Preferably, adaptively allocating the loads of the target nodes includes: determining the operation preparation of the target nodes adequate for a (N−1)-th allocation threshold when the analyzed resource usage do not exceed an N-th allocation threshold among the N allocation thresholds; and determining the operation preparation of the target node adequate for an N-th allocation threshold when the analyzed resource usage exceed the N-th allocation threshold.

Preferably, changing the power states of the target nodes includes: changing the power states of the target nodes into any one of an on state, a sleep state, a hibernation state and an OFF state.

In accordance with a third aspect of the present invention, there is provided an apparatus for controlling load allocation in a cluster system, the apparatus including: a cluster having a plurality of target nodes; and a cluster power management module configured to analyze resource usage by monitoring load states of the target nodes, allocate loads of the target nodes based on the analyzed resource usage and M release thresholds that have settled in response to a decrease of the resource usage, and control the power states of the target nodes in accordance with the allocated loads.

Preferably, the cluster power management module includes: a node monitoring unit configured to monitor the load states of the target nodes; a node usage analysis unit configured to analyze the resource usage of the target nodes by using the monitored load state; a threshold management unit configured to check, when the analyzed resource usage decreases, a release threshold to which the analyzed resource usage belongs among the M release thresholds and determine additional release preparation of one or more target nodes adequate for the checked release threshold; a load control unit configured to adaptively control load allocation of the target nodes in accordance with the determined release preparation; a load allocation unit configured to adaptively allocate loads to the target nodes based on the adaptive control of the load allocation; and a node power control unit configured to change the power states of the target nodes in accordance with the adaptively allocated loads.

Preferably, the analyzed resource usage includes resource usage at a cluster level and resource usage at a target node level.

Preferably, the threshold management unit determines, when the analyzed resource usage exceeds an M-th release threshold among the M release thresholds, additional release preparation of one or more target nodes adequate for a (M−1)-th release threshold.

Preferably, the threshold management unit determines, when the analyzed resource usage does not exceed an M-th release threshold among the M release thresholds, additional release preparation of one or more target nodes adequate for an M-th release threshold.

Preferably, the node power control unit changes the power states of the target nodes into any one of an on state, a sleep state, a hibernation state and an OFF state.

In accordance with a fourth aspect of the present invention, there is provided a method for controlling load allocation in a cluster system, the method including: monitoring load states of target nodes in the cluster system; analyzing resource usage of the target nodes based on the monitored load states; allocating loads of the target nodes based on the analyzed resource usage and M release thresholds that have settled in response to a decrease of the analyzed resource usage; and controlling the target nodes to change the power states thereof in accordance with the allocated loads.

Preferably, controlling the target nodes to change the power states thereof includes: checking, when the analyzed resource usage decreases, a release threshold to which the analyzed resource usage belongs among the M release thresholds; adaptively allocating the loads of the target nodes based on release preparation determined by the checked release threshold; and controlling the power states of the target nodes in accordance with the adaptively allocated loads.

Preferably, adaptively allocating the loads of the target nodes includes: determining the release preparation of target node adequate for a (M−1)-th release threshold when the analyzed resource usage does not exceed the release threshold among the M release thresholds; and determining additional release preparation of one or more target nodes adequate for an M-th release threshold when the analyzed resource usage exceeds an M-th release threshold.

Preferably, changing the power states of the target nodes includes: changing the power states of the target nodes into any one of an OFF state, a sleep state and a hibernation state.

As described above, power consumed by target nodes in a cluster system is effectively reduced by adaptively load allocation using a plurality of thresholds. Therefore, performance deterioration of the cluster system which is caused by a long period of time required for switching on/off the management target nodes may be minimized, and undesired power consumption of the management target nodes may be reduced.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE EMBODIMENTS

Hereinafter, an embodiment of the present invention will be described in detail with reference to the accompanying drawings.

Figure 1:
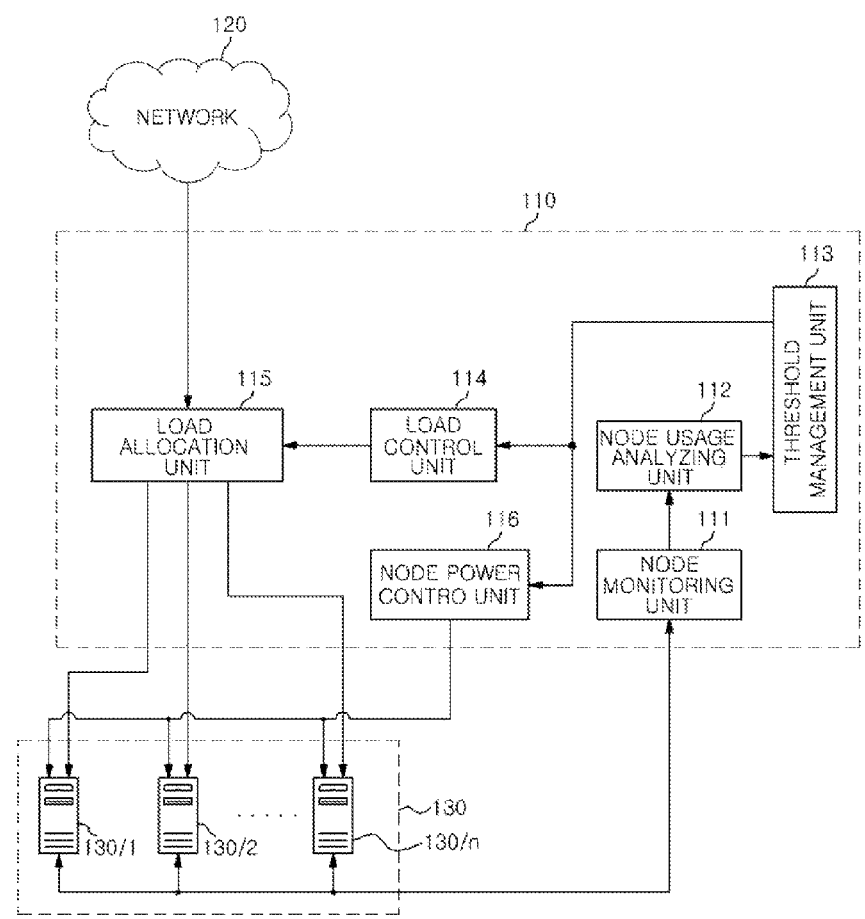
FIG. 1 is a block diagram of an apparatus for controlling load allocation of a cluster system in accordance with an embodiment of the invention.

FIG. 1 is a block diagram of an apparatus for controlling load allocation of a cluster system in accordance with an embodiment of the invention. The apparatus of the embodiment includes a power management module 110 and a cluster module 130. The power management module 110 includes a node monitoring unit 111, a node usage analyzing unit 112, a threshold management unit 113, a load control unit 114, a load allocation unit 115, and a node power control unit 116. The cluster module 130 includes a plurality of target nodes 130/1 to 130/n required to be managed. Here, each of the target nodes may refer to a device such as a server installed in a data center or the like.

The target nodes 130/1 to 130/n substantially perform an actual operation of the cluster system. Each of the target nodes performs an operation in accordance with loads adaptively allocated by the load allocation unit 115, and a power state thereof is controlled by the node power control unit 116.

The cluster power management module 110 monitors load conditions of the target nodes 130/1 to 130/n under operation to analyze resource usage. When the analyzed resource usage are increased, the cluster power management module 110 adaptively allocates the loads of the target nodes 130/1 to 130/n based on the analyzed resource usages and N allocation thresholds that have settled in response to the increase of the analyzed resource usage, and controls the target nodes 130/1 to 130/n so that the power states of the target nodes can be changed with the adaptively allocated loads. Herein, the allocation thresholds may be automatically settled adaptively based on the number of the target nodes 130/1 to 130/n, or may be manually settled by an operator or a manager of the cluster system.

For example, when the resource usage of the target nodes increases, the power state of the target nodes may become any one among, e.g., an ON state, a sleep state, a hibernation state and an OFF state in accordance with the degree of the increase in the resource usage.

Meanwhile, when the analyzed resource usage decreases, the cluster power management module 110 adaptively allocates the loads of the target nodes 130/1 to 130/n based on the analyzed resource usages and M release thresholds that have settled in response to the decrease of the analyzed resource usage of the target nodes 130/1 to 130/n, and controls the target nodes 130/1 to 130/n so that the power states of the target nodes can be changed with the adaptively allocated loads. Herein, the release thresholds may be automatically settled adaptively based on the number of the target nodes 130/1 to 130/n forming the cluster module 130, or may be manually set by an operator or a manager of the cluster system.

For example, when the resource usages are decreased, the power states of the target nodes may become among, e.g., an OFF state, a sleep state, and a hibernation state in accordance with the degree of the decrease in the resource usages.

Each of the target nodes 130/1 to 130/n performs actual operations required for the operation of the data center. The operations in the target nodes can be performed by instructions, messages or data received from a remote server or a remote client through a network 120. Herein, the network 120 may refer to, e.g., a wide area network (WAN) or the like.

Meanwhile, the node monitoring unit 111 monitors the load states of the target nodes 130/1 to 130/n and provides the monitoring result to the node usage analysis unit 112.

The node usage analysis unit 112 analyzes the resource usage of the target nodes 130/1 to 130/n, i.e., the resource usages at a cluster level and the resource usages at a target node level, using the monitoring result, and provides the analysis result to the threshold management unit 113. Here, the analysis result of the resource usages may be state information indicating the increase or decrease of the resource usages.

When it is checked that the resource usage increases based on the analyzed resource usage, the threshold management unit 113 determines an allocation threshold to which the resource increase belongs among N allocation thresholds, and prepares to additionally operate one or more target nodes adequate for the determined allocation threshold. However, when it is checked that the resource usage decreases, the threshold management unit 113 determines a release threshold to which the resource increase belongs among M release thresholds, and prepares to additionally release one or more target nodes adequate for the determined release threshold. Instruction for the additional operation preparation and the additional release preparation is then provided to the load control unit 114 and the node power control unit 116.

To do so, the N allocation thresholds settled in response to the increase in the resource usage and the M release thresholds settled in response to the decrease in the resource usage may be stored in an internal memory (not shown) of the threshold management unit 113. The number of the allocation thresholds and the release thresholds may be automatically set adaptively (or actively) in accordance with the number of the target nodes 130/1 to 130/n or may be manually set by an operator (or a manger).

In other words, when the resource usage increases and does not exceed an N-th allocation threshold among the N allocation thresholds, the threshold management unit 113 determines additional operation preparation of one or more target nodes in accordance with a (N−1)-th allocation threshold. When the resource usage increases and exceeds an N-th allocation threshold among the N allocation thresholds, the threshold management unit 113 determines additional operation preparation of the target node adequate for the N-th allocation threshold.

Meanwhile, when the resource usage decreases and exceeds an M-th release threshold among the M release thresholds, the threshold management unit 113 determines additional release preparation of one or more target nodes adequate for a (M−1) release threshold. When the resource usage decreases and does not exceed an M-th release threshold among the M release thresholds, the threshold management unit 113 determines release preparation of one or more target node adequate for the M-th release threshold.

Next, the load control unit 114 adaptively controls the load allocation of the target nodes in accordance with the preparation instruction (i.e., operation preparation instruction or release preparation instruction) determined by the threshold management unit 113. The load allocation unit 115 adaptively allocates loads to the target nodes based on the adaptive control of the load allocation by the load control unit 114.

Meanwhile, the node power control unit 116 controls corresponding target nodes to change the power states of the corresponding target nodes based on the loads allocated adaptively in accordance with the operation preparation instruction or release preparation instruction. When the operation preparation instruction is transmitted, the node power control unit 116 controls the corresponding target nodes to change their power states into any one of an ON state, a sleep state, a hibernation state and an OFF state in accordance with the adaptively allocated load. When the release preparation instruction is transmitted, the node power control unit 116 controls the corresponding target nodes to change their power states into any one of an OFF state, a sleep state and a hibernation state in accordance to the adaptively allocated load.

Figure 2:
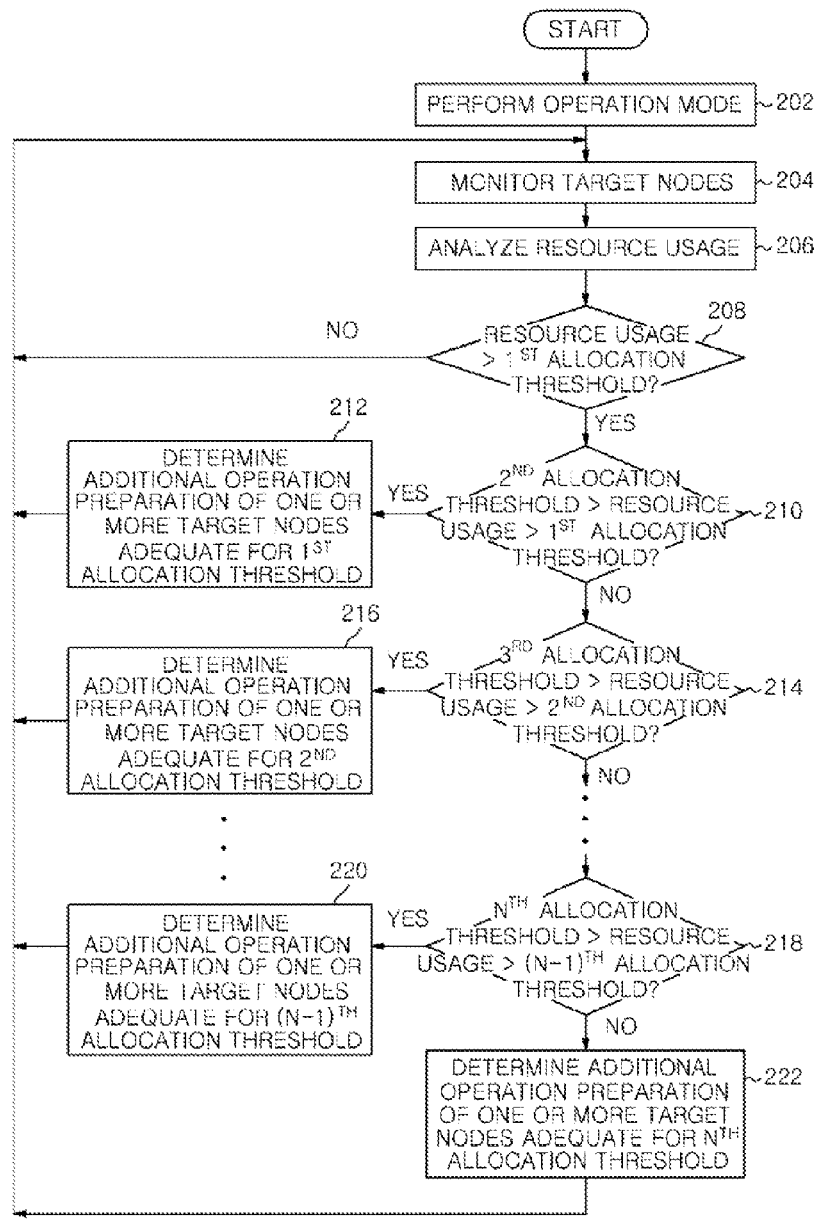
FIG. 2 is a flowchart showing a method for adaptively allocating loads of target nodes when resource usage of the target nodes increases in accordance with an embodiment of the invention.

FIG. 2 is a flowchart showing a method for adaptively allocating loads of the target nodes when resource usage of the target nodes increases in accordance with an embodiment of the invention.

Referring to FIG. 2, when the cluster module 130 executes in an operation mode in operation 202, the node monitoring unit 111 of the cluster power management module 110 monitors the load states of the target nodes 130/1 to 130/n forming the cluster module 130 in operation 204. The monitoring result is provided to the node usage analysis unit 112.

In operation 206, the node usage analysis unit 112 analyzes the resource usage of the target nodes 130/1 to 130/n using the monitoring result and provides the analysis result to the threshold management unit 113. Herein, the resource usage includes the resource usage at a cluster level and the resource usage at a target node level. The analysis result of the resource usage may be state information indicating the increase or decrease of the resource usage.

In response thereto, the threshold management unit 113 checks whether the resource usage increases or decreases.

Assuming that the resource usage increases, the threshold management unit 113 checks whether or not the resource usage exceeds a first allocation threshold among the N allocation thresholds in operation 208. If it is determined that the resource usage exceeds the first allocation threshold, it is checked whether the resource usage belongs to the range between the first allocation threshold and a second allocation threshold or exceeds a second allocation threshold in operation 210.

If it is determined in operation 210 that the resource usage belongs to the range between the first allocation threshold and the second allocation threshold, the threshold management unit 113 determines operation preparation instruction corresponding thereto, i.e., operation preparation of one or more addition target nodes adequate for the first allocation threshold in operation 212.

As a result, the load allocation unit 115 adaptively allocates loads to the target nodes in accordance with the first allocation threshold, and the node power control unit 116 changes the power states of the target nodes in accordance with the load adaptively allocated based on the first allocation threshold. Here, the power states of the target nodes in accordance with the first allocation threshold may be changed to any one of an ON state, a sleep state, a hibernation state and an OFF state.

If it is determined in step 210 that the resource usage exceeds the second allocation threshold, it is checked whether the resource usage belongs to the range between the second allocation threshold and a third allocation threshold or exceeds the third allocation threshold in operation 214.

If it is determined in operation 214 that the resource usage belongs to the range between the second allocation threshold and the third allocation threshold, the threshold management unit 113 determines operation preparation instruction corresponding thereto, i.e., operation preparation of the target node in accordance with the second allocation threshold in operation 216.

As a result, the load allocation unit 115 adaptively allocates loads to the target nodes in accordance with the second allocation threshold, and the node power control unit 116 changes the power states of the target nodes in accordance with the load adaptively allocated based on the second allocation threshold. Here, the power states of the target nodes in accordance with the second allocation threshold may be changed to any one of an ON state, a sleep state, a hibernation state and an OFF state.

In other words, this embodiment performs, when the resource usage increases in the cluster module, the method for determining operation preparation of the corresponding target nodes adequate for the allocation threshold determined by sequential comparison between the resource usages and the preset allocation thresholds, allocating the loads adaptively, and controlling the power states of the corresponding target nodes.

Therefore, if it is determined in operation 214 that the resource usage exceeds the third allocation threshold, it is checked whether the resource usage belongs to the range between an N-th allocation threshold and a (N−1)-th allocation threshold or exceeds an N-th allocation threshold in operation 218.

If it is determined in operation 218 that the resource usage belongs to the range between the N-th allocation threshold and the (N−1)-th allocation threshold, the threshold management unit 113 determines an operation preparation instruction corresponding thereto, i.e., the additional operation preparation of one or more target nodes adequate for the (N−1)-th allocation threshold in operation 220.

As a result, the load allocation unit 115 adaptively allocates the loads to the target nodes in accordance with the (N−1)-th allocation threshold, and the node power control unit 116 changes the power states of the target nodes in accordance with the loads adaptively allocated based on the (N−1)-th allocation threshold. Here, the power states of the target nodes in accordance with the (N−1)-th allocation threshold may be changed to any one of an ON state, a sleep state, a hibernation state and an OFF state.

If it is determined in operation 218 that the resource usage exceeds the N-th allocation threshold, the threshold management unit 113 determines operation preparation instruction corresponding thereto, i.e., additional operation preparation of one or more target node adequate for the N-th allocation threshold in operation 222, and then proceeds to operation 204 to repeat the above operations.

As a result, the load allocation unit 115 adaptively allocates the loads to the target nodes in accordance with the N-th allocation threshold, and the node power control unit 116 changes the power states of the target nodes in accordance with the loads adaptively allocated based on the N-th allocation threshold. Here, the power states of the target nodes in accordance with the N-th allocation threshold may be changed to any one of an ON state, a sleep state, a hibernation state and an OFF state.

Figure 3:
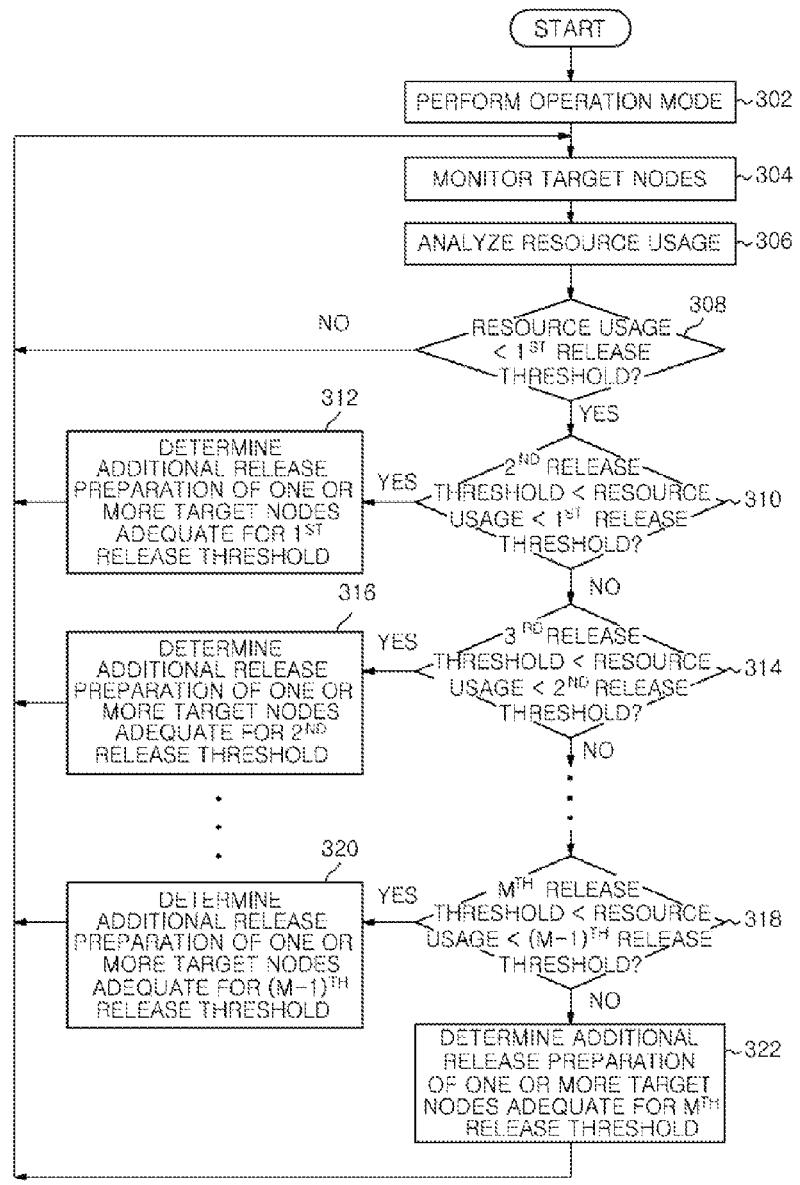
FIG. 3 is a flowchart showing a method for adaptively allocating loads of target nodes when resource usage of the target nodes decreases in accordance with an embodiment of the invention.

FIG. 3 is a flowchart showing a method for adaptively allocating loads of target nodes when resource usage of the target nodes decreases in accordance with an embodiment of the present invention.

Referring to FIG. 3, when the cluster module 130 executes in an operation mode in operation 302, the node monitoring unit 111 of the cluster power management module 110 monitors the load states of the target nodes 130/1 to 130/n forming the cluster module 130 in operation 304. The monitoring result is provided to the node usage analysis unit 112.

In operation 306, the node usage analysis unit 112 analyzes the resource usage of the target nodes 130/1 to 130/n using the monitoring result and provides the analysis result to the threshold management unit 113 in operation 306. Here, the resource usage includes the resource usage at a cluster level and the resource usage at a target node level. The analysis result of the resource usage may be state information indicating the increase or decrease of the resource usages.

In response thereto, the threshold management unit 113 checks whether the resource usage increases or decreases.

Assuming that the resource usage decreases, the threshold management unit 113 checks whether or not the resource usage exceeds a first release threshold among N allocation thresholds in operation 308. If it is determined that the resource usage exceeds the first release threshold, it is checked whether the resource usage belongs to the range between the first release threshold and a second release threshold or exceeds a second release threshold in operation 310.

If it is determined in operation 310 that the resource usage belongs to the range between the first release threshold and the second release threshold, the threshold management unit 113 determines additional release preparation instruction corresponding thereto, i.e., additional release preparation of one or more target nodes adequate for the first release threshold, in operation 312.

As a result, the load allocation unit 115 adaptively allocates the loads to the target nodes adequate for the first release threshold, and the node power control unit 116 changes the power states of the target nodes in accordance to the loads adaptively allocated based on the first release threshold. Here, the power states of the target nodes in accordance with the first release threshold may be changed to any one of an OFF state, a sleep state and a hibernation state.

If it is determined in operation 310 that the resource usage does not exceed the second release threshold, it is checked whether the resource usage belongs to the range between a third release threshold and the second release threshold or does not exceed a third release threshold in operation 314.

If it is determined in operation 314 that the resource usage belongs to the range between the second release threshold and the third release threshold, the threshold management unit 113 determines additional release preparation instruction corresponding thereto, i.e., additional release preparation of one or more target nodes adequate for the second release threshold in operation 316.

As a result, the load allocating unit 115 adaptively allocates the loads to the target nodes in accordance with the second release threshold, and the node power control unit 116 changes the power states of the target nodes in accordance with the loads allocated adaptively based on the second release threshold. Here, the power states of the target nodes in accordance with the second release threshold may be changed to any one of an OFF state, a sleep state and a hibernation state.

In other words, the embodiment performs, when the resource usage decreases in the cluster, the processes for determining release preparation of the target nodes in accordance with the release threshold determined by sequential comparison between the resource usages and the M release thresholds, allocating the loads adaptively, and changing the power states of the corresponding target nodes.

Therefore, if it is determined in operation 314 that the resource usage exceeds the third release threshold, it is checked whether the resource usage belongs to the range between an M-th release threshold and a (M−1)-th release threshold or does not exceed an M-th release threshold.

Therefore, if it is determined in operation 314 that the resource usage does not exceed the third release threshold, it is checked whether the resource usage belongs to the range between the M-th release threshold and the (M−1)-th release threshold or does not exceed the M-th release threshold in operation 318.

If it is determined in operation 318 that the resource usage belongs to the range between the M-th release threshold and the (M−1)-th release threshold, the threshold management unit 113 determines release preparation instruction corresponding thereto, i.e., release preparation of one or more target node adequate for the (M−1)-th release threshold in operation 320.

As a result, the load allocation unit 115 adaptively allocates the loads to the target nodes in accordance with the (M−1)-th release threshold, and the node power control unit 116 changes the power states of the target nodes in accordance with the loads allocated adaptively based on the (M−1)-th release threshold. Here, the power states of the target nodes in accordance with the (M−1)-th release threshold may be changed to any one of an OFF state, a sleep state and a hibernation state.

If it is determined in operation 318 that the resource usage exceeds the M-th release threshold, the threshold management unit 113 determines release preparation instruction corresponding thereto, i.e., release preparation of one or more target node adequate for the (M−1)-th release threshold in operation 320 and then proceeds to operation 304 to repeat the operations thereafter.

As a result, the load allocation unit 115 adaptively allocates loads to the target nodes in accordance with the M-th release threshold, and the node power control unit 116 changes the power states of the target nodes in accordance with the loads adaptively allocated based on the M-th release threshold. Here, the power states of the target nodes in accordance with the M-th release threshold may be changed to any one of an OFF state, a sleep state, and a hibernation state.

Meanwhile, the blocks or the operations described in the embodiments may refer to parts of codes, segments, or modules that include one or more executable instructions for performing specified logic functions. Moreover, it should be noted that the functions described in the blocks or the operations may be performed in a different order from the embodiments described above. For example, the functions described in two adjacent blocks or operations may be performed substantially at the same time or in reverse order depending on corresponding functions.

The above description is only an example of the technical concept of the present invention, and it will be understood by those skilled in the art that various changes and modifications may be made without departing from the original scope of the present invention. In other words, the embodiments as described above the present invention are not intended to limit the technical concept of the present invention, and are merely intended to describe the present invention.

Therefore, the protection scope of the present invention should be defined by the accompanying claims and all technical spirits of equivalents thereof should be interpreted as being included in the scope of the present invention.

What is claimed is:

1. An apparatus for controlling load allocation in a cluster system, the apparatus comprising:
  a cluster module having a plurality of target nodes, each target node having three or more different power states; and
  a cluster power management module configured to analyze resource usage of the target nodes by monitoring load states of the target nodes, allocate loads to the target nodes based on the analyzed resource usage and N allocation thresholds in response to an increase of the analyzed resource usage, and control the target nodes to be set to any one of the three or more different power states in accordance with the allocated loads.

2. The apparatus of claim 1, wherein the cluster power management module comprises:
  a node monitoring unit configured to monitor the load states of the target nodes;
  a node usage analysis unit configured to analyze the resource usage of the target nodes using the monitored data;
  a threshold management unit configured to check, when the analyzed resource usage increases, an allocation threshold to which the analyzed resource usage belongs among the N allocation thresholds and determine additional operation preparation of one or more target nodes adequate for the checked allocation threshold;
  a load control unit configured to adaptively control load allocation of the target nodes in accordance with the determined operation preparation;
  a load allocation unit configured to adaptively allocate loads to the target nodes based on the adaptive control of the load allocation; and
  a node power control unit configured to set the power states of the target nodes in accordance with the adaptively allocated loads.

3. The apparatus of claim 2, wherein the analyzed resource usage comprises resource usage at a cluster level and resource usage at a target node level.

4. The apparatus of claim 2, wherein the threshold management unit determines, when the analyzed resource usage does not exceed an N-th allocation threshold among the N allocation thresholds, additional operation preparation of the one or more target nodes adequate for a (N−1)-th allocation threshold.

5. The apparatus of claim 2, wherein the threshold management unit determines, when the analyzed resource usage exceed an N-th allocation threshold among the N number allocation thresholds, operation preparation of the one or more target nodes adequate for the N-th allocation threshold.

6. The apparatus of claim 2, wherein the three or more different power states of each target node comprise an ON state, a sleep state, a hibernation state and an OFF state.

7. A method for controlling load allocation in a cluster system having a plurality of target nodes, each target node having three or more different power states, the method comprising: monitoring load states of the target nodes in the cluster system; allocating loads of the target nodes based on resource usage of the target nodes which have been analyzed using the monitored load states and N allocation thresholds that have settled in response to an increase of the resource usage; controlling the target nodes to change the to be set to any one of the three or more different power states thereof in accordance with the allocated loads, wherein said controlling the target nodes to change the power states thereof comprises: analyzing the resource usage of the target nodes; checking, when the analyzed resource usage increases, an allocation threshold to which the analyzed resource usage belongs to among the N allocation thresholds; determining additionally operation preparation of one or more target nodes adequate for the checked allocation threshold; adaptively allocating the loads of the target nodes based the determined operation preparation; and changing setting the power states of the target nodes in accordance with the adaptively allocated loads.

8. The method of claim 1, wherein said adaptively allocating the loads of the target nodes comprises: determining the operation preparation of the target nodes adequate for a (N−1)-th allocation threshold when the analyzed resource usage do not exceed an N-th allocation threshold among the N allocation thresholds; and determining the operation preparation of the target node adequate for an N-th allocation threshold when the analyzed resource usage exceed the N-th allocation threshold.

9. The method of claim 1, wherein said setting the power states of the target nodes comprises: setting the power states of the target nodes to any one of an ON state, a sleep state, a hibernation state and an OFF state.

10. An apparatus for controlling load allocation in a cluster system, the apparatus comprising:
   a cluster having a plurality of target nodes, each target node having three or more different power states; and
   a cluster power management module configured to analyze resource usage by monitoring load states of the target nodes, allocate loads of the target nodes based on the analyzed resource usage and M release thresholds in response to a decrease of the resource usage, and control the target nodes to be set to any one of three or more different power states in accordance with the allocated loads.

11. The apparatus of claim 10, wherein the cluster power management module comprises:
   a node monitoring unit configured to monitor the load states of the target nodes;
   a node usage analysis unit configured to analyze the resource usage of the target nodes by using the monitored load state;
   a threshold management unit configured to check, when the analyzed resource usage decreases, a release threshold to which the analyzed resource usage belongs among the M release thresholds and determine additionally release preparation of one or more target nodes adequate for the checked release threshold;
   a load control unit configured to adaptively control load allocation of the target nodes in accordance with the determined release preparation;
   a load allocation unit configured to adaptively allocate loads to the target nodes based on the adaptive control of the load allocation; and
   a node power control unit configured to set the power states of the target nodes in accordance with the adaptively allocated loads.

12. The apparatus of claim 11, wherein the analyzed resource usage comprises resource usage at a cluster level and resource usage at a target node level.

13. The apparatus of claim 11, wherein the threshold management unit determines, when the analyzed resource usage exceeds an M-th release threshold among the M release thresholds, additional release preparation of one or more target nodes adequate for a (M−1)-th release threshold.

14. The apparatus of claim 11, wherein the threshold management unit determines, when the analyzed resource usage does not exceed an M-th release threshold among the M release thresholds, additional release preparation of one or more target nodes adequate for an M-th release threshold.

15. The apparatus of claim 11, wherein the node power control unit sets the power states of the target nodes to any one of an ON state, a sleep state, a hibernation state and an OFF state.

* * * * *